United States Patent
Heynssens

(10) Patent No.: US 6,666,643 B1
(45) Date of Patent: Dec. 23, 2003

(54) LOAD LIFTING APPARATUS FOR USE ON A VEHICLE

(75) Inventor: Robert Heynssens, 216 N. Bluff, Gladstone, MI (US) 49837

(73) Assignee: Robert Heynssens, Gladstone, MI (US)

( * ) Notice: Subject to any disclaimer, the term of this patent is extended or adjusted under 35 U.S.C. 154(b) by 0 days.

(21) Appl. No.: 10/350,496

(22) Filed: Jan. 24, 2003

(51) Int. Cl.$^7$ .................................................. B60P 1/44
(52) U.S. Cl. ........................ 414/542; 212/180; 414/522; 414/462
(58) Field of Search ................................ 414/522, 540, 414/541, 542, 544, 462; 212/180; 224/403, 496

(56) References Cited

U.S. PATENT DOCUMENTS

| | | | | |
|---|---|---|---|---|
| 2,702,678 A | * | 2/1955 | Flock ........................ | 244/137.1 |
| 2,950,073 A | * | 8/1960 | McLain et al. ............ | 244/137.1 |
| 3,552,587 A | * | 1/1971 | Warren ...................... | 244/137.1 |
| 3,572,513 A | * | 3/1971 | Tantlinger et al. .......... | 212/180 |
| 4,083,429 A | * | 4/1978 | Abbott ........................ | 414/541 |
| 4,239,438 A | | 12/1980 | Everson | |
| 4,239,440 A | | 12/1980 | James | |
| 4,274,789 A | * | 6/1981 | Martin et al. ................ | 414/501 |
| 5,232,329 A | | 8/1993 | Livingston | |
| 5,346,355 A | * | 9/1994 | Riemer ........................ | 414/542 |
| 5,743,702 A | | 4/1998 | Gunderson | |
| 6,019,567 A | | 2/2000 | Lutkus et al. | |
| 6,059,527 A | | 5/2000 | Ranken et al. | |
| 6,123,495 A | * | 9/2000 | Callahan et al. ............ | 414/340 |
| 6,435,804 B1 | * | 8/2002 | Hutchins ...................... | 414/540 |
| 6,491,331 B1 | * | 12/2002 | Fox ............................. | 296/26.09 |
| 2003/0049111 A1 | * | 3/2003 | Berger ......................... | 414/467 |

FOREIGN PATENT DOCUMENTS

GB 2105294 * 3/1983

* cited by examiner

Primary Examiner—James W. Keenan
(74) Attorney, Agent, or Firm—George E. Haas; Quarles & Brady LLP

(57) ABSTRACT

A frame with a pair of primary tracks is positioned on a vehicle. A platform is connected by a plurality of flexible ties to a like plurality of hangers which travel along the primary tracks. An elevator mechanism winds the flexible ties onto reels to rise the platform toward the primary tracks and unwinds the flexible ties to lower the platform. Extension tracks can be removably aligned with the primary tracks to project beyond the vehicle. By moving the hangers onto the extension tracks, the platform can be removed from the vehicle and then lowered to the ground. The reverse process is employed to move the platform and objects thereon from the ground into the vehicle. The extension tracks with the hangers and platform attached thereto can be detached from the primary tracks and placed on a free standing frame to raise and lower the platform remote from the vehicle.

27 Claims, 3 Drawing Sheets

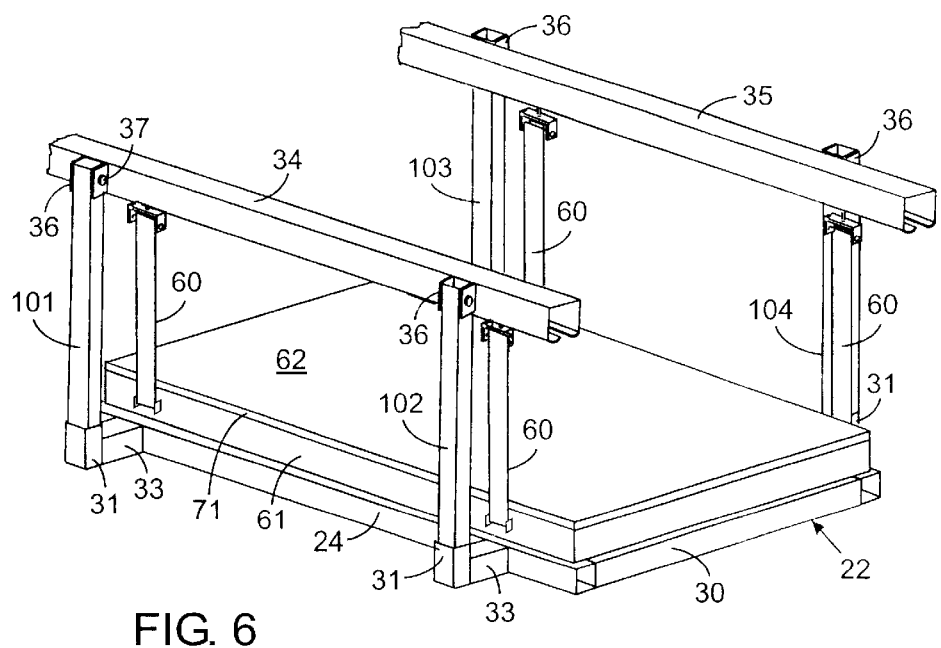
FIG. 6
FIG. 7
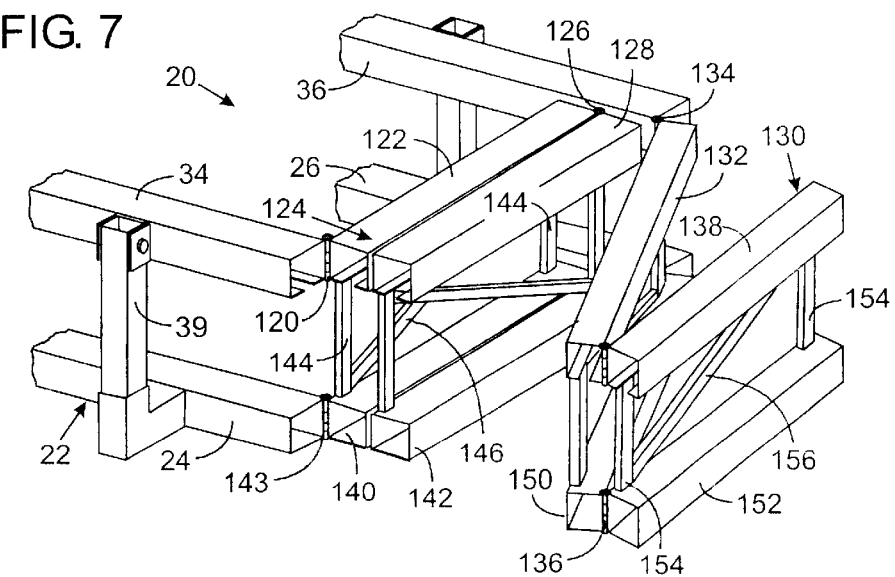

LOAD LIFTING APPARATUS FOR USE ON A VEHICLE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to apparatus that are mountable on motor vehicles, such as pickup trucks, vans, and the like, for moving loads onto and off of the vehicles.

2. Description of the Related Art

Pickup trucks have a cargo bed with a rear tail gate that tilts downward to permit loads to be placed onto the cargo bed for transport. Vans have rear doors which open to provide access to the cargo area so that objects can be placed into and removed from the van. Typically, one or more persons carries the load to and from the pickup truck or van. If the load is relatively heavy or cumbersome for people to carry, a forklift or other type of industrial truck is used to pick the load off the ground, raise it to the height of the bed of the vehicle, and then position the load onto that bed. The industrial truck can be utilized with the reverse process to unload the vehicle. However, there are often situations where an industrial truck is unavailable at the location where it is desired to load or unload the pickup truck or van.

Therefore, it is desirable to provide a mechanism which is attached to the vehicle to load and unload objects from the cargo bed. Because such apparatus may occupy some of the cargo space or interfere with the ability to carry certain types of loads for which the apparatus is not required, it is further desirable that the loading and unloading apparatus be easily removable from the vehicle by the user.

SUMMARY OF THE INVENTION

An apparatus for loading and unloading objects into and from a vehicle includes a main frame for placement in the vehicle. The main frame has a base frame supporting a pair of spaced apart primary tracks. A pair of extension tracks have couplings that attach the extension tracks to the primary tracks, wherein the extension tracks upon being moved into an operational position are aligned with the extension tracks and project beyond the vehicle. In one embodiment, the couplings enable the extension tracks to be detached from the primary tracks for storage in the vehicle when not in use. In another embodiment, the extension tracks are pivotally connected the primary tracks and divided into a plurality of hinged sections, thereby enabling the extension tracks to be folded into the vehicle when not in use. A plurality of hangers travel along the primary tracks and the extension tracks.

A platform is provided to support the object being loaded or unloaded. An elevator mechanism is mounted to the platform and connected to the plurality of hanger for raising and lowering the platform with respect to the primary tracks and the extension tracks. In the preferred embodiment, the elevator mechanism comprises a plurality of flexible ties each connected to one of the plurality of hangers and wound onto one of a plurality of reels. The flexible ties can comprise woven fabric belts, other types of belts, ropes, cables, wire ropes, chains, and the like. A prime mover, such as an electric motor drives a transmission connected to a plurality of reels thereby providing rotational force to wind and unwind the flexible ties onto and from the reels.

To load an object, the extension tracks are placed into the operational position in which they extend beyond the vehicle. The platform is moved out of the vehicle so that the hangers travel from the primary tracks onto the extension tracks. Then the elevator is operated to lower the platform to the ground. The object to be loaded is placed on the platform and the elevator raises the platform above the height of the vehicle's floor. The raised platform with the object thereon is pushed into the vehicle during which the hangers travel from the extension tracks back onto the primary tracks. After the platform is positioned inside the vehicle, the elevator is operated to lower the platform onto the vehicle floor. The extension tracks then are either removed and stowed in the vehicle or are folded into the vehicle.

The reverse process is used to unload the object from the vehicle.

BRIEF DESCRIPTION OF THE DRAWINGS

FIG. 6 is a perspective view of the load platform connected to a free different support frame for use detached from a motor vehicle; and FIG. 7 is a perspective view of an alternative connection between different sections of a track of the load lifting apparatus.

DETAILED DESCRIPTION OF THE INVENTION

Figure 1:
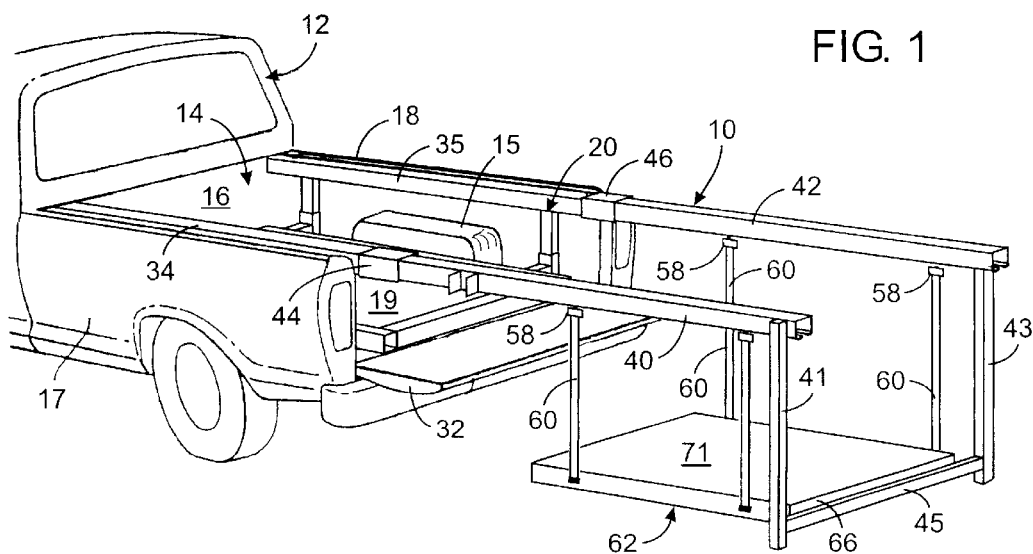
FIG. 1 is a fragmented perspective view of a motor vehicle on which the main frame of a load lifting apparatus has been installed.
Figure 2:
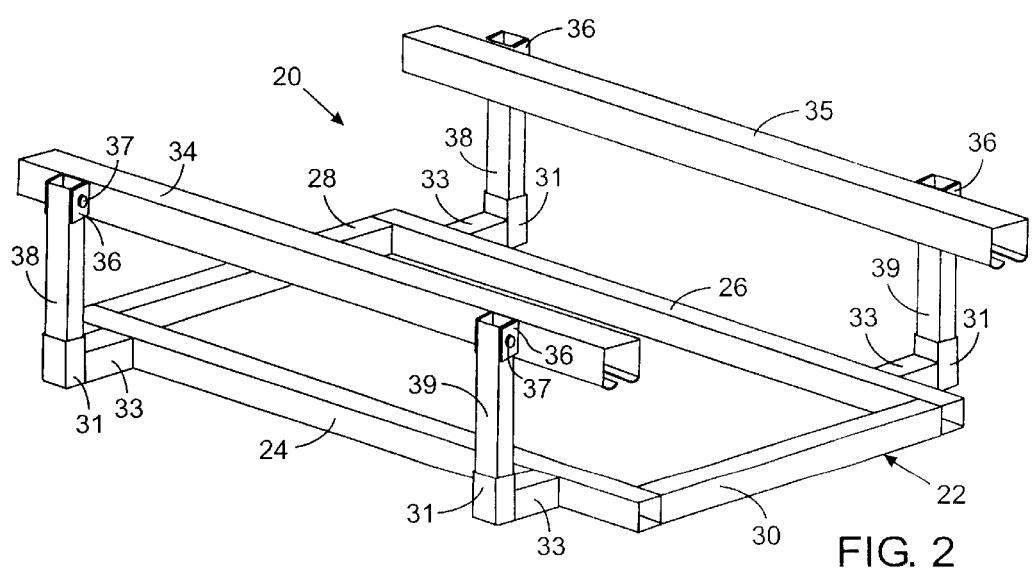
FIG. 2 is a perspective view of a main frame of the load lifting apparatus, which has been removed from the motor vehicle.

With initial reference to FIGS. 1 and 2, the present load lifting apparatus 10 is installed on a pickup truck 12 which has a cargo bed 14 formed by a front wall 16 and spaced apart side walls 17 and 18 with a floor 19 there between. Although the present invention is being described in the context of use on a pickup truck, it can be employed with other types of motor vehicles and trailers, generically referred to herein as a "vehicle". A main frame 20 of the load lifting apparatus 10 is located within the cargo bed 14 and is secured therein using conventional tie-downs (not visible) that engage hooks provided on the interior surfaces of side walls 17 and 18. The main frame 20 includes a base frame 22 resting on the bed floor 19 and comprising a pair of longitudinal rails 24 and 26 which extend parallel to and spaced from the side walls 17 and 18 just inside the rear wheel wells 15 of the vehicle 12. A first transverse rail 28 is connected between the two longitudinal rails 24 and 26 adjacent the front wall 16 and a second transverse rail 30 extends between the two longitudinal rails 24 and 26 adjacent the vehicle's tailgate 32. The four rails 24–30 preferably comprise square metal tubes that are welded together.

The main frame 20 also has a pair of vertical supports 38 and 39 extending upward from the ends of the first and second transverse rails 28 and 30 that extend laterally beyond the longitudinal rails 24 and 26. Preferably vertical supports 38 and 39 removably fit into sockets 31 at the ends of members 33 that project laterally outward from the longitudinal rails 24 and 26. Alternatively the vertical supports 38 and 39 can be welded to the lateral members 33. A primary track 34 or 35 is attached to the upper end of each pair of vertical supports 38 and 39, so as to be parallel to the adjacent side wall 17 or 18 and flush with or slightly below the tops of that wall. This spatial relationship ensures that the main frame 20 fits within a cargo bed 14 which is enclosed by a truck cap or cover. The primary tracks 34 and 35 are connected to the respective vertical support 38 or 39 by a socket or U-shaped bracket 36 that is welded to the track and secured to the vertical support by a pin or bolt 37. This connection allows the tracks to be removed from the vertical supports which facilitates installation and removal of the main frame 20 from the cargo bed 14 of the motor vehicle 12.

Figure 3:
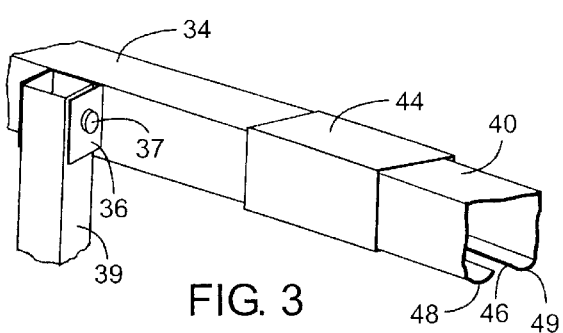
FIG. 3 is an enlarged fragmented view of the connection between two sections of a track of the load lifting apparatus.

With reference to FIGS. 1 and 3, when it is desired to load or unload the motor vehicle 12, the load lifting apparatus 10 is placed into an operational position in which a pair of extension tracks 40 and 42 are attached to the rear ends of the primary tracks 34 and 35 of the main frame 20 by means of couplings 44 and 46. When coupled in this manner, each extension track is aligned with the respective primary track. Each track coupling 44 and 46 is a sleeve which slightly larger than the outer dimensions of the two tracks being joined, as seen with respect to coupling 44 and primary tracks 34 and 40 shown in detail in FIG. 3. The coupling 44 is welded to one of the tracks, preferably the extension tracks 40, and slips over the other track to align the two tracks for use in the illustrated operational position. A vertical support leg 41 or 43 extends downward from the remote end of the respective extension track 40 or 42 to the ground. A cross member 45 connects the lower ends of the support legs 41 and 43 to prevent lateral movement. The support legs 41 and 43 preferably are hinged to the cross member 45 so that the assembly can be folder for storage in the cargo bed.

The tracks 34, 35, 40 and 42 are of the same type as used to support sliding doors being formed from a square or rectangular cross-section tube with a central longitudinal slot 46 in the bottom side as illustrated for extension track 40 in FIG. 3. The bottom side of the coupling 44 has a similar slot. The longitudinal slot 46 is defined in the tracks by two internally concave bottom walls 48 and 49, that form a pair of grooves in which a wheeled hanger travels inside the tracks.

Figure 4:
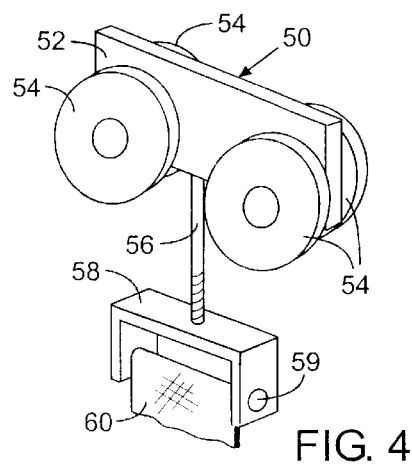
FIG. 4 is a perspective view of a hanger which travels within the tracks of FIG. 3.

FIG. 4 illustrates one of the wheeled hangers 50 which comprises a bar 52 to which four wheels 54 are attached by a pair of axles extending through apertures in the bar. The wheels and bar are received within the two extension tracks 40 and 42 in FIG. 2 with the wheels riding in the grooves formed by concave walls 48 and 49. A threaded rod 56 extends downwardly from the bar 52, passing through the slot 46 in the extension tracks 40 and 42. An inverted U-shaped bracket 58 is attached to the lower end of the threaded rod 56 and has a pin 59 extending between its downwardly projecting legs. The pin 59 passes through a loop at one end of a tie, such as a woven fabric belt 60.

With reference specifically to FIG. 2, two such hangers 50 are received within each extension track 40 and 42 with the associated bracket 58 located beneath the respective track. The woven fabric belts 60 extend downwardly to a load platform 62. The load platform 62 has a rectangular shape which is sized to permit vertical movement between the vehicle tailgate 32 and the vertical support legs 41 and 43, as will be described. With additional reference to FIG. 5, the load platform 62 has a rectangular frame 61 formed by four metal outer members 63, 64, 65, and 66, which are welded together. Three metal transverse members 67, 68 and 69 extend within the frame between outer members 63 and 65 to provide additional support for the load being carried. A flat metal plate 71, shown in FIG. 1, is attached on top of the frame 61 to provide a surface on which to place the objects being lifted to and from the vehicle 12.

Figure 5:
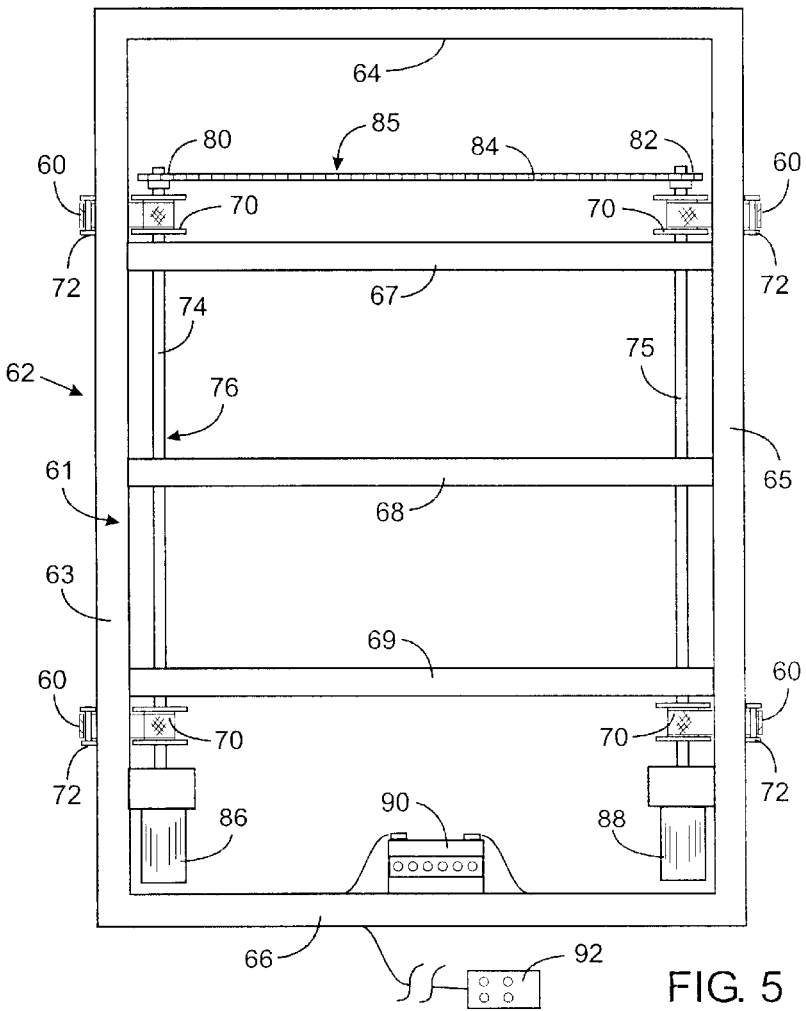
FIG. 5 is a top view of the load platform of the load lifting apparatus with the top plate removed.

With continuing reference to FIG. 5, each belt 60 passes over a separate pulley 72 attached to the outside vertical surface of outer member 63 or 65 and through an aperture in the respective member. The belt 60 then winds onto one of four reels 70 within the frame 71. The two reels 70, that are adjacent outer member 63, are fixedly attached to a first shaft 74 which is parallel to that frame member, The first shift 74 extends through apertures in the transverse frame members 67, 68 and 69 and are supported by bearings attached to those latter members. Similarly, the other two reels 70, adjacent the opposite outer member 65, are fixedly attached to a second shaft 75 extending parallel to that member. The second shaft 75 also extends through apertures in the transverse frame members 67, 68 and 69 being supported by bearings mounted thereon. A pair of sprockets 80 and 82 are respectively attached to ends of the two shafts 74 and 75 and a chain 84 is connected between those sprockets to form a mechanical linkage 85 that rotationally couples the two shafts. Other kinds of mechanical linkages, such as a transverse shaft and bevel gears, can be used in place of the sprockets 80 and 82 and chain 84 to couple the two shafts 74 and 75. The two shafts 74 and 75 and the mechanical linkage 85 comprise a transmission 76 for rotating the four reels 70. Alternative transmissions may be employed to rotate the reels in other forms of the powered platform 62 of the present invention.

A separate 12 volt, direct current electric motor 86 or 88 is coupled to the opposite end of each shaft 74 or 75, respectively, to rotate the associated shaft. The polarity of the direct current applied to the electric motors 86 and 88 determines the direction in which the shafts 74 and 75 are driven. One polarity is used to wind the belts 60 onto the reels 70 and the opposite polarity is employed to unwind the belts. When the platform 62 is attached to the motor vehicle 12, a connection to the vehicle's electrical system provides power for the motors. A 12 volt battery 90 is mounted on a bracket attached to frame member 66 to furnish power when the platform 62 is used off the vehicle with a free-standing frame, as will be described. The detachable connection to the electrical system of the motor vehicle 12 also can be used to recharge the platform battery 90. The battery 90 and the electric motors 86 and 88 are connected to a hand-held control unit 92, which enables the user to activate the two motors 86 and 88 in unison and select the direction that the motors are to rotate. Alternatively a single electric motor may be employed to drive the shafts 74 and 75. As a further alternative, another type of a prime mover, such as a hydraulic motor or an internal combustion engine, can be substituted for the electric motors.

Rotation of the first and second shafts 74 and 75 in one direction causes the woven fabric belts 60 to wind onto the four reels 70. The belts 60 on one side of the frame 61 are wound in the opposite direction around the reels 70 from the belts on the other side of the frame so that the rotation of the shafts 74 and 75 in one direction winds all the belts onto the reels. This action raises the load platform 62 toward the extension tracks 40 and 42, as shown in FIG. 2. Any of several kinds of flexible ties may be substituted for the woven fabric belt 60. For example, a rope, cable, wire rope, chain, other type of a belt, and the like may be used and are generically referred to herein as a "tie" or as "ties."

When the load platform 62 is raised above the height of the tailgate 32 and the base frame 22 inside the cargo bed 14, the user pushes the load platform toward the truck 12. This motion of the load platform is transferred upward by the belts 60, thereby causing the hangers 50 to travel within the extension tracks 40 and 42 toward the truck. Alternatively a winch can be provided to move the load platform horizonitally. The user continues to move the load platform 62 along the extension tracks 40 and 42 and onto the primary tracks 34 and 35 of the main frame 20. This movement continues until the load platform 62 is entirely within the cargo bed 14 of the motor vehicle 12. At that point, the user activates the motors 86 and 88 to unwind the belts 60 from the reels 70, lowering the load platform 62 and any object thereon onto the base frame 22 resting on the cargo bed floor 19.

After the load platform 62 has been positioned within the cargo bed 14, the user removes the extension tracks 40 and 42 from the primary tracks 34 and 35 and detaches the support legs 41 and 43 and the cross member 45. Each of these components then can be stored within the cargo bed 14. The tailgate 32 then is raised and locked, completing the loading process.

To unload the vehicle, thee reverse of the loading process is carried out. Specifically the user assembles the extension tracks 40 and 42, the support legs 41 and 43 and the cross-support 45. That assembly is attached to the rear ends of the primary tracks 34 and 35. With the tailgate 32 lowered, the user activates the motors 86 and 88 to raise the load platform 62 slightly above the base frame 22. Then the user pushes the load platform 62 out the rear opening of the cargo bed 14. This motion causes the hangers 50 to travel within the main channels 34 and 35 into the extension tracks 40 and 42. When the load platform 62 is entirely beyond the tailgate 32, the user activates the motors 86 and 88 to unwind the belts 60 from their respective reels 70, thereby lowering the load platform and any object thereon to the ground. The object then can be moved off of the load platform which is a relatively small distance above the ground as compared to the cargo bed 14 of the motor vehicle. After the object has been removed, the load platform 62 can be raised and placed back into the cargo bed 14, and the various components disassembled and stowed in the motor vehicle 12.

Alternatively the load platform 62 can remain on the ground and disconnected from the remainder of the load lifting appratus 10. Specifically, the motors 86 and 88 can be operated to slacken the belts 60, thereby enabling the extension tracks 40 and 42 to be removed from the main frame 20 within the truck. The extension tracks can be placed along side the load platform 62 and the respective belts then wound up onto the reels 70. Otherwise, the hangers 50 can be slid out of an open end of the extension tracks 40 and 42 before the belts are wound onto the reels.

Referring to FIG. 6, the load platform 62 also can be used with a free standing frame 100. The free-standing frame 100 has a base frame 22 located on the ground or a building floor. The base frame 22 is identical to the base frame placed in the load bed of the motor vehicle and previously described. However, four vertical legs 101, 102, 103 and 104 are inserted into the sockets 31 of the base frame and extend upward higher than the vertical supports 38 and 39 for the motor vehicle. The longer length of the four vertical legs 101–104 enables the platform 62 to be raised higher from the ground or the building floor. Sets of four vertical legs with different lengths can be provided for various applications of the free standing frame 100. This provides a sturdy free standing frame 100 remote from the vehicle 12 on which the two extension tracks 40 and 42 can be mounted. Fittings are provided so that the members of the free standing frame 100 can be detached from each other for compact storage when not in use.

The motors 86 and 88 are operated to raise and lower the load platform 62 within the free standing frame 100. For example, the load lifting appratus can be utilized to raise an object to a suitable height for a person to work on that object, or to raise a load to a height of an adjacent surface onto which the object will be transferred.

FIG. 7 illustrates an alternative manner in which the tracks of the lifting apparatus are extended beyond the back of the truck. This alterative configuration is particularly useful for smaller vehicles, such as vans and sport utility vehicles, which carry lighter loads. It should be understood the configuration of the lifting apparatus may vary from that illustrated for the pickup truck in order to fit inside these other vehicles. In this alternative configuration, each extension track is divided into two sections that are hinged together and in turn hinged to the rear end of the primary track of the main frame 20. Specifically, a first hinge 120 couples the rear end of the first primary track 34 on the main frame 20 to the proximate end of a first section 122 for the first extension track 124. The remote end of the first extension track section 122 has a second hinge attached thereto and to a second section 128 of the first extension track 124. Similarly a first pair of hinged frame extension rails 140 and 142 are attached by a hinge 139 to the rear end of longitudinal rail 24 of the base frame 22. The proximate extension rail 140 is connected by two vertical members 144 and a diagonal member 146 to the first extension track section 122 to form a truss for supporting the first extension track 124 when cantilevered from the main frame 22. In a similar manner, the remote extension rail 142 is connected by another set of two vertical members and a diagonal member to the second extension track section 128 to continue the truss for the first extension track 124. The first extension track 124 is shown in the stowed position in which its two sections 122 and 124 are folded against one another and positioned orthogonal to the first primary track 34 of the main frame 20. Likewise the frame extension rails 140 and 142 are folded against the base frame 22. In this stowed position the first extension track 124 is parallel to the tailgate 32. It should be understood that the rear ends of the two primary tracks 34 and 35 of the main frame 20 must be spaced from the interior surface of the tailgate 32 when closed so as to accommodate the folded extension tracks 124 and 130.

The rear end of the second primary track 35 of the main frame 20 extends beyond the rear end of the first primary track 34 by an amount sufficient to clear the folded first extension track 124. This allows the second extension track 130 to be folded against and behind the first extension track. Specifically, the rear end of the second primary track 35 is coupled to a first section 132 of the second extension track 130 by a third hinge 134. The opposite end of that first section 132 is connected by another hinge 135 to a second section 138 of the second extension track 130. Each section 122, 128, 132 and 138 of the extension tracks 124 and 130 has a cross-section identical to the primary tracks 34 and 35 so that the hangers 50 can travel therein. A second pair of hinged frame extension rails 150 and 152 are attached by a hinge to the rear end of longitudinal rail 26 of the main frame 22. The proximate extension rail 150 is connected by two vertical members and a diagonal member to the proximate extension track section 132 to form a truss that supports the second extension track 130 when cantilevered from the main frame 22. The remote extension rail 122 is connected by another pair of vertical members 154 and a diagonal member 156 to the second extension track section 138 to continue the truss for the first extension track 130.

In order to load or unload the motor vehicle 12, the two extension tracks 124 and 130 and associated extension rails are unfolded into alignment with the associated primary track 34 or 35. In a van or other vehicle which carries relatively light loads, the truss supporting the track extension 124 and 130 eliminates the need for support legs 41 and 43 at the remote ends of the track extensions as in FIG. 1. However, those support legs may be provided in order to lift heavier objects.

The foregoing description was primarily directed to a preferred embodiment of the invention. Although some attention was given to various alternatives within the scope the invention, it is anticipated that one skilled in the art will likely realize additional alternatives that are now apparent from disclosure of embodiment of the invention. Accordingly, the scope of the invention should be determined from the following claims and not limited by the above disclosure.

What is claimed is:

1. A load lifting and moving apparatus for use with a vehicle, said apparatus comprising:
    a main frame for placement on the vehicle and including a pair of primary tracks in a spaced apart relationship;
    first and second extension tracks;
    first and second couplings each of which aligns a respective one of the first and second extension tracks with a different one of the primary tracks in an operational position in which the respective extension track projects beyond the vehicle;
    a plurality of hangers each one engaging one of the primary tracks and capable of traveling there along and along one of the first and second extension tracks in the operational position;
    a platform for supporting an object being lifted and moved by the apparatus; and
    an elevator mechanism mounted to the platform and connected to the plurality of hangers for raising and lowering the platform with respect to the primary tracks and the extension tracks.

2. The apparatus as recited in claim 1 wherein the elevator mechanism comprises:
    a prime mover;
    a plurality of reels;
    a transmission rotationally connecting the prime mover to the plurality of reels; and
    a plurality of flexible ties each connected to one of the plurality of hangers and wound onto one of the plurality of reels.

3. The apparatus as recited in claim 2 wherein the transmission comprises:
    a pair of shafts on which the plurality of reels are mounted, and the prime mover being coupled to one of the pair of shafts; and
    a mechanical linkage rotationally coupling the pair of shafts.

4. The apparatus as recited in claim 3 wherein the mechanical linkage comprises a pair of sprockets each attached to a different one of the pair of shafts; and a chain engaging the pair of sprockets.

5. The apparatus as recited in claim 3 wherein the prime mover comprises a first electric motor connected to one of the pair of shafts, and a second electric motor connected to another one of the pair of shafts.

6. The apparatus as recited in claim 2 wherein the prime mover comprises an electric motor.

7. The apparatus as recited in claim 2 wherein the plurality of flexible ties are selected from the group consisting of belts, woven fabric belts, chains, ropes, cables, and wire ropes.

8. The apparatus as recited in claim 1 further comprising a pair of legs for supporting the first and second extension tracks on a surface on which the vehicle rests.

9. The apparatus as recited in claim 1 wherein the plurality of couplings removably attach the first and second extension tracks to the primary tracks.

10. The apparatus as recited in claim 1 wherein the plurality of couplings comprise hinges which attach the first and second extension tracks to the primary tracks.

11. The apparatus as recited in claim 10 further comprising first and second extension rails pivotally connected to the main frame, wherein the first extension rail is connected to the first extension track and the second extension rail is connected to the second extension track.

12. The apparatus as recited in claim 10 wherein each extension track comprises first and second sections that are pivotally connected together.

13. The apparatus as recited in claim 1 further comprising a free standing frame for supporting the pair of extension tracks detached from the main frame.

14. The apparatus as recited in claim 1 wherein each of the plurality of hangers has at least one wheel that rides on the respective primary track.

15. An apparatus for loading and unloading an object onto and off of a vehicle, said apparatus comprising:
    a main frame for placement on the vehicle and including a base frame supporting first and second primary tracks in a spaced apart relationship;
    first and second extension tracks;
    a first coupling which in an operational position of the apparatus releasably aligns the first extension track with the first primary track;
    a second coupling which in the operational position releasably aligns the second extension track with the second primary track;
    a plurality of hangers each one engaging one of the primary tracks and capable of traveling there along and along one of the extension tracks aligned with the one primary track;
    a power platform having a frame to which are attached a prime mover and a plurality of reels, and further having a transmission which rotationally couples the prime mover to the plurality of reels; and
    a plurality of flexible ties each connected to one of the plurality of hangers and wound onto one of the plurality of reels.

16. The apparatus as recited in claim 15 wherein the transmission comprises:
    a pair of shafts onto which the plurality of reels are mounted and the prime mover being coupled to one of the pair of shafts; and
    a mechanical linkage rotationally coupling the pair of shafts.

17. The apparatus as recited in claim 16 wherein the mechanical linkage comprises a pair of sprockets each attached to one of the pair of shafts; and a chain engaging the pair of sprockets.

18. The apparatus as recited in claim 16 wherein the prime mover comprises a first electric motor connected to one of the shafts, and a second electric motor connected to another one of the pair of shafts.

19. The apparatus as recited in claim 15 wherein the prime mover comprises an electric motor.

20. The apparatus as recited in claim 15 wherein the plurality of flexible ties are selected from the group consisting of belts, woven fabric belts, chains, ropes, cables, and wire rope.

21. The apparatus as recited in claim 15 further comprising a pair of legs for supporting the pair of extension tracks on a surface on which the vehicle rests.

22. The apparatus as recited in claim 15 wherein the first and second couplings have released positions in which the extension tracks are not aligned with the primary tracks.

23. The apparatus as recited in claim 15 wherein the first coupling removably attaches the first extension track to the first primary track, and the second coupling removably attaches the second extension track to the second primary track.

24. The apparatus as recited in claim 15 wherein the first coupling comprises a first hinge which pivotally attaches the first extension track to the first primary track, and the second coupling comprises a second hinge which pivotally attaches the second extension track to the second primary track.

25. The apparatus as recited in claim 24 wherein each extension track comprises first and second sections that are pivotally connected together.

26. The apparatus as recited in claim 15 further comprising a free standing frame for supporting the pair of extension tracks detached from the main frame.

27. The apparatus as recited in claim 15 wherein each of the plurality of hangers has at least one wheel that rides on the respective primary track.

* * * * *